United States Patent
Smidebrant

(10) Patent No.: US 12,024,051 B2
(45) Date of Patent: Jul. 2, 2024

(54) BATTERY CONTROL SYSTEM

(71) Applicant: VOLVO TRUCK CORPORATION, Gothenburg (SE)

(72) Inventor: Tobias Smidebrant, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 52 days.

(21) Appl. No.: 17/370,549

(22) Filed: Jul. 8, 2021

(65) Prior Publication Data

US 2022/0009374 A1     Jan. 13, 2022

(30) Foreign Application Priority Data

Jul. 10, 2020  (EP) .................................. 20185232

(51) Int. Cl.
  *B60L 58/12*      (2019.01)
  *B60L 53/53*      (2019.01)
  *B60L 58/22*      (2019.01)

(52) U.S. Cl.
  CPC ............. *B60L 58/12* (2019.02); *B60L 58/22* (2019.02); *B60L 53/53* (2019.02); *B60L 2240/529* (2013.01); *B60L 2240/547* (2013.01); *B60L 2240/549* (2013.01); *B60Y 2200/91* (2013.01)

(58) Field of Classification Search
  CPC .......... B60L 58/12; B60L 58/22; B60L 53/53; B60L 2240/529; B60L 2240/547; B60L 2240/549; B60L 2200/36; B60L 50/60; B60L 50/64; B60L 58/18; B60L 58/10; B60L 3/0046; B60Y 2200/91; Y02T 10/70; Y02T 90/16; H02J 7/00032; H02J 7/0013

USPC ......................................................... 320/120
  See application file for complete search history.

(56) References Cited

U.S. PATENT DOCUMENTS

| | | | | |
|---|---|---|---|---|
| 9,496,730 B2* | 11/2016 | Gallegos | ................. | B60L 58/26 |
| 9,868,360 B2* | 1/2018 | Smidebrant | ............... | B60L 7/20 |
| 9,937,815 B2* | 4/2018 | Smidebrant | ....... | H01M 10/4257 |
| 10,516,189 B2* | 12/2019 | Loftus | .................. | H01M 10/48 |
| 10,988,049 B2* | 4/2021 | Wang | ..................... | G01R 31/367 |
| 11,214,208 B2* | 1/2022 | Lennevi | ..................... | H02J 3/00 |
| 11,368,031 B2* | 6/2022 | Qian | ...................... | H02J 7/1423 |

(Continued)

FOREIGN PATENT DOCUMENTS

| | | | | |
|---|---|---|---|---|
| CN | 103858019 A * | 6/2014 | .......... | B60L 11/1853 |
| EP | 2774798 A2 * | 9/2014 | ............ | B60L 3/0046 |

(Continued)

OTHER PUBLICATIONS

European Search Report dated Jan. 14, 2021 in corresponding European Patent Application No. 20185232.4, 8 pages.

*Primary Examiner* — M Baye Diao
(74) *Attorney, Agent, or Firm* — Venable LLP; Jeffri A. Kaminski

(57) ABSTRACT

A master electronic control unit controls a plurality of batteries, and is communicatively connected to each one of the battery control units. The master electronic control unit provides a predefined electric interference to the traction voltage bus after a signal to open the at least one contactor of each battery has been provided. Each battery control unit detects the predefined electric interference, and when the predefined electric interference is detected, the at least one battery control unit issues a signal that the predefined electric interference was detected.

15 Claims, 3 Drawing Sheets

(56) References Cited

U.S. PATENT DOCUMENTS 11,440,433 B2 * 9/2022 Brunet .................... B60L 58/18
2015/0323603 A1   11/2015 Kim et al.

FOREIGN PATENT DOCUMENTS

| EP | 2774798 | A2 |   | 9/2014 |            |
|----|---------|-----|---|--------|------------|
| EP | 3154150 | A1 | * | 4/2017 | ................ B60L 1/02 |
| EP | 3828565 | A1 | * | 6/2021 | .............. B60L 58/12 |
| GB | 2506468 | A  | * | 4/2014 | .............. B60L 1/003 |
| WO | 2020104013 | A1 |   | 5/2020 |       |

* cited by examiner

BATTERY CONTROL SYSTEM

TECHNICAL FIELD

The invention relates to a control system for controlling an electric energy system for propulsion of a vehicle. The invention also relates to an electric energy system for propulsion of a vehicle, to a method for identifying at least one welded contactor of an electric energy system and to a vehicle.

The invention can be applied in heavy-duty vehicles, such as trucks, buses and construction equipment. Although the invention will be described with respect to an at least partly electric truck, the invention is not restricted to this particular vehicle, but may also be used in other vehicles such as electric buses, electric construction equipment, electric passenger cars etc. The invention is also applicable to marine vessels comprising an electric energy system for propulsion of the marine vessel.

BACKGROUND

A vehicle may comprise and be at least partly propelled by an electric energy system. The electric energy system may be a high voltage system having a voltage level of e.g. 400-1000 volts (V). The electric energy system may comprise a plurality of batteries which are connected to each other via a traction voltage bus, e.g. a high voltage traction voltage bus. The batteries are configured to provide power to at least one electric traction motor of the vehicle.

Each one of the batteries is connectable to the traction voltage bus by two high voltage contactors, also referred to as high voltage relays. Accordingly, each one of the batteries can be selectively connected to and disconnected from the traction voltage bus by opening and closing the two high voltage contactors.

The contactors may in some situations fail and get welded, and can thereby not be opened. As such, the traction voltage bus may even after a signal to open all of the contactors still be connected to at least one of the batteries. This can be dangerous for e.g. a user of the vehicle and/or for service personnel. Therefore, it is important to know if at least one contactor has been welded.

In view of the above, there is a need to provide an improved control system and method for identifying when at least one contactor has been welded.

SUMMARY

An object of the invention is to provide an improved control system for controlling an electric energy system for propulsion of a vehicle, in particular a control system which provides improved identification of at least one welded contactor. A further object of the invention is to provide an improved electric energy system for propulsion of a vehicle, an improved method for identifying at least one welded contactor of an electric energy system and an improved vehicle comprising a control system and/or an electric energy system.

According to a first aspect of the invention, the object is achieved by a control system according to claim 1. According to a second aspect of the invention, the object is achieved by an electric energy system according to claim 8. According to a third aspect, the object is achieved by a method according to claim 9. According to a fourth aspect, the object is achieved by a vehicle according to claim 15.

According to the first aspect of the invention, the object is achieved by a control system for controlling an electric energy system for propulsion of a vehicle. The electric energy system comprises:

a traction voltage bus;

a plurality of batteries electrically connectable to each other via the traction voltage bus, wherein each battery is electrically connectable to the traction voltage bus by at least one contactor. Further, the control system comprises a respective battery control unit for each one of the plurality of batteries, wherein the control system further comprises:

a master electronic control unit for controlling the plurality of batteries, wherein the master electronic control unit is communicatively connected to each one of the battery control units, and wherein the master electronic control unit is configured to provide a predefined electric interference to the traction voltage bus after a signal to open the at least one contactor of each battery has been provided, and wherein each battery control unit is configured to detect the predefined electric interference, and when the predefined electric interference is detected by at least one of the battery control units, the at least one battery control unit is further configured to issue a signal indicative of that the predefined electric interference was detected.

By the provision of a control system as disclosed herein, improved identification of a possible welded contactor is achieved. In particular, the present invention is based on a realization that a master electronic control, which also may be referred to as a separate and/or a central master electronic control unit not forming part of any one of the plurality of batteries, can be advantageously used for performing and being part of, or in charge of, a welded contactor identification process. In particular, the master electronic control unit is configured to provide the predefined electric interference which can be identified by each one of the battery control units, implying a simplified procedure. In addition, the master electronic control unit may identify if any one of the batteries' contactors are welded or not, and more importantly, it may identify which one or which ones of the contactor/s that is/are welded. Thereby, one master electronic control unit can be used for the identification. The configuration allows for a simplified identification procedure which for example may allow a user to swiftly identify which contactor/s that is/are welded, and may thereafter take appropriate actions to reduce or mitigate the risk of e.g. personal injuries.

The plurality of batteries, also referred to as traction batteries, may be of any suitable type such for example lithium-ion batteries, lithium polymer batteries, fuel-cell batteries, lead-acid batteries, nickel metal hydride batteries etc. The one or more batteries are typically rechargeable batteries.

The battery control units may also be referred to as battery monitoring units for each battery. Further, each battery control unit may be a slave battery control unit which only is configured to control its own battery and to be controlled by the master electronic control unit.

The expression "each battery control unit is configured to detect the predefined electric interference" means herein that the respective battery control unit is configured to detect that its battery experiences the predefined electric interference.

The expression "the master electronic control unit is configured to provide the predefined electric interference" may herein mean that the master electronic control unit is configured to issue a signal to provide the predefined electric interference.

Optionally, each battery control unit may be configured to detect if the battery experiences a voltage drift during a relaxation period after the signal to open the at least one contactor of each battery has been provided, and when at least one battery does not experience the voltage drift, the battery control unit for the at least one battery is further configured to issue a signal indicative of that no voltage drift was detected. Thereby, a further improved identification process may be achieved by use of the aforementioned configuration. More particularly, it has been realized that a voltage drift, caused by battery relaxation may advantageously be used for identifying a welded contactor. Accordingly, no presence of a voltage drift in the battery is an indication that the battery is still connected to the traction voltage bus. Battery relaxation is well known as such by the skilled person, and may be defined as a voltage reduction of a battery after it has been disconnected. Preferably, the battery control unit for the at least one battery may further be configured to issue the signal indicative of that no voltage drift was detected to the master electronic control unit. Thereby the master electronic control unit may identify that the at least one contactor is welded Optionally, the master electronic control unit may further be configured to identify if at least one contactor of at least one of the batteries is welded before providing the predefined electric interference to the traction voltage bus. For example, the master electronic control unit may identify that there still is a measurable voltage on the traction voltage bus after the contactors of each battery has been requested to be opened. This provides an indication that something is wrong and can thus be used for initiating a procedure to identify which one or which ones of the contactors that is/are welded.

Preferably, the battery control unit for the at least one battery may further be configured to issue the signal indicative of that the predefined electric interference was detected to the master electronic control unit. Thereby the master electronic control unit can also take care of the actual identification of which contactor/s that is/are welded. More particularly, the present invention is based on a realization that the master electronic control unit can control the complete procedure of identifying which one or which ones of the contactors that are welded, implying a simplified control system.

Optionally, the master electronic control unit may further be configured to issue a signal to each one of the battery control units indicative of that the predefined electric interference will be provided. Thereby each battery control unit may be prepared for when it should look for the predefined electric interference, implying further improved identification of a welded contactor. Still optionally, the signal to each one of the battery control units indicative of that the predefined electric interference will be provided may comprise information about a point in time when the predefined electric interference will be provided to the traction voltage bus. As such, each one of the battery control units may know when it shall look for the predefined electric interference, implying further improved identification of a welded contactor.

Optionally, the predefined electric interference may be at least one of a predefined voltage level, a predefined load, a load with a predefined current level, and a predefined frequency level. The predefined electric interference as used herein may be defined as any type of measurable electric property which can be measured and identified by a battery control unit.

According to the second aspect of the invention, the object is achieved by an electric energy system for propulsion of a vehicle, wherein the electric energy system comprises:

a traction voltage bus;

a plurality of batteries electrically connectable to each other via the traction voltage bus, wherein each battery is electrically connectable to the traction voltage bus by at least one contactor; and the control system according to any one of the embodiments of the first aspect of the invention.

The electric energy system as mentioned herein is preferably a high voltage electric energy system having a voltage level of e.g. 400-1000 V.

Advantages and effects of the second aspect of the invention are largely analogous to the advantages and effects of the first aspect of the invention. Further, all embodiments of the first aspect of the invention are applicable to and combinable with all embodiments of the second aspect of the invention and vice versa.

According to the third aspect of the invention, the object is achieved by a method for identifying at least one welded contactor of an electric energy system for propulsion of a vehicle, wherein the electric energy system comprises a traction voltage bus, a plurality of batteries electrically connectable to each other via the traction voltage bus, wherein each battery is electrically connectable to the traction voltage bus by at least one contactor, and a master electronic control unit for controlling the plurality of batteries, wherein the master electronic control unit is communicatively connected to a respective battery control unit for each one of the batteries. The method comprises:

providing a predefined electric interference to the traction voltage bus by use of the master electronic control unit after a signal to open the at least one contactor of each battery has been provided;

for each battery, determining if the predefined electric interference is detected, and when the predefined electric interference is detected by at least one battery control unit, issuing a signal from the at least one battery control unit indicative of that the predefined electric interference was detected.

Thereby, an improved identification procedure is achieved in which it can be efficiently identified which contactor/s that is/are welded. Advantages and effects of the third aspect of the invention are largely analogous to advantages and effects of the first and second aspects of the invention. Further, all embodiments of the third aspect of the invention are applicable to and combinable with all embodiments of the first and second aspects of the invention and vice versa.

Optionally, the method may further comprise, for each battery, determining if it experiences a voltage drift during a relaxation period after the signal to open at least one contactor of each battery has been provided, and when at least one battery does not experience the voltage drift, issuing a signal from the battery control unit for the at least one battery indicative of that no voltage drift was experienced.

Optionally, the method may further comprise identifying when at least one contactor of at least one of the batteries is welded before providing the predefined electric interference to the traction voltage bus.

Optionally, the signal from the at least one battery control unit indicative of that the predefined electric interference was detected may be issued to the master electronic control unit.

Optionally, the method may further comprise issuing a signal to each one of the battery control units indicative of that the predefined electric interference will be provided.

Optionally, the predefined electric interference may be at least one of a predefined voltage level, a predefined load, a load with a predefined current level, and a predefined frequency level.

According to the fourth aspect of the invention, the object is achieved by vehicle comprising the control system according to any one of the embodiments of the first aspect of the invention and/or an electric energy system according to any one of the embodiments of the second aspect of the invention.

In the following, possible features and feature combinations of the disclosure are disclosed, presented as items:

Items

1. A control system for controlling an electric energy system (1) for propulsion of a vehicle (100), wherein the electric energy system comprises:
a traction voltage bus (2);
a plurality of batteries (3', 3") electrically connectable to each other via the traction voltage bus (2), wherein each battery is electrically connectable to the traction voltage bus by at least one contactor (A, B); wherein the control system comprises a respective battery control unit (BMU1, BMU2) for each one of the plurality of batteries, wherein each battery control unit is configured to detect if the battery experiences a voltage drift during a relaxation period after a signal to open the at least one contactor of each battery has been provided, and when at least one battery does not experience the voltage drift, the battery control unit for the at least one battery is further configured to issue a signal indicative of that no voltage drift was detected.

2. The control system according to item 1, wherein the control system further comprises: a master electronic control unit (MECU) for controlling the plurality of batteries, wherein the master electronic control unit is communicatively connected to each one of the battery control units, and wherein the master electronic control unit (MECU) is configured to provide a predefined electric interference to the traction voltage bus after a signal to open the at least one contactor of each battery has been provided, and wherein each battery control unit is configured to detect the predefined electric interference, and when the predefined electric interference is detected by at least one of the battery control units, the at least one battery control unit is further configured to issue a signal indicative of that the predefined electric interference was detected.

3. The control system according to any one of the preceding items, wherein the control system further comprises:
a master electronic control unit (MECU) for controlling the plurality of batteries, wherein the master electronic control unit is communicatively connected to each one of the battery control units, and wherein the battery control unit for the at least one battery is further configured to issue the signal indicative of that no voltage drift was detected to the master electronic control unit.

4. The control system according to item 2, wherein the master electronic control unit is further configured to identify if at least one contactor of at least one of the batteries is welded before providing the predefined electric interference to the traction voltage bus.

5. The control system according to any one of items 2 or 4, wherein the battery control unit for the at least one battery is further configured to issue the signal indicative of that the predefined electric interference was detected to the master electronic control unit.

6. The control system according to any one of items 2, 4 or 5, wherein the master electronic control unit is further configured to issue a signal to each one of the battery control units indicative of that the predefined electric interference will be provided.

7. The control system according to any one of items 2, 4, 5 or 6, wherein the predefined electric interference is at least one of a predefined voltage level, a predefined load, a load with a predefined current level, and a predefined frequency level.

8. An electric energy system (1) for propulsion of a vehicle (100), wherein the electric energy system comprises:
a traction voltage bus (2);
a plurality of batteries (3', 3") electrically connectable to each other via the traction voltage bus (2), wherein each battery is electrically connectable to the traction voltage bus by at least one contactor (A, B); and
the control system according to any one of the preceding items.

9. A method for identifying at least one welded contactor of an electric energy system (1) for propulsion of a vehicle, wherein the electric energy system comprises a traction voltage bus (2), a plurality of batteries (3', 3") electrically connectable to each other via the traction voltage bus (2), wherein each battery is electrically connectable to the traction voltage bus (2) by at least one contactor (A, B) and wherein each battery comprises a respective battery control unit, wherein the method comprises:
for each battery, determining if it experiences a voltage drift during a relaxation period after a signal to open at least one contactor of each battery has been provided, and when at least one battery does not experience the voltage drift, issuing a signal from the battery control unit of the at least one battery indicative of that no voltage drift was experienced.

10. The method according to item 9, wherein the electric energy system (1) further comprises a master electronic control unit (MECU) for controlling the plurality of batteries, wherein the master electronic control unit is communicatively connected to the respective battery control unit for each one of the batteries, wherein the method further comprises: providing (S1) a predefined electric interference to the traction voltage bus by use of the master electronic control unit after the signal to open the at least one contactor of each battery has been provided;
for each battery, determining (S2) if the predefined electric interference is detected, and when the predefined electric interference is detected by at least one battery control unit, issuing (S3) a signal from the at least one battery control unit indicative of that the predefined electric interference was detected.

11. The method according to item 10, further comprising identifying when at least one contactor of at least one of the batteries is welded before providing the predefined electric interference to the traction voltage bus.

12. The method according to any one of the items 10-11, wherein the signal from the at least one battery control unit indicative of that the predefined electric interference was detected is issued to the master electronic control unit.

13. The method according to any one of items 10-12, further comprising issuing a signal to each one of the battery control units indicative of that the predefined electric interference will be provided.

14. The method according to any one of items 10-13, wherein the predefined electric interference is at least one of a predefined voltage level, a predefined load, a load with a predefined current level, and a predefined frequency level.

15. A vehicle comprising the control system according to any one of items 1-7 and/or an electric energy system according to item 8.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings are schematic and not drawn to scale.

DETAILED DESCRIPTION OF EXAMPLE EMBODIMENTS OF THE INVENTION

Figure 1:
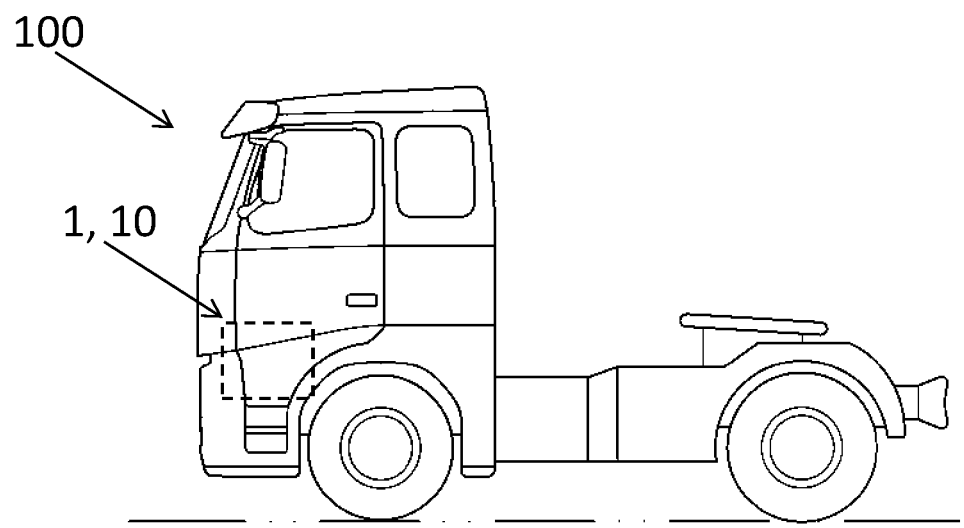
FIG. 1 is a side view of a vehicle according to an example embodiment of the present invention.

In FIG. 1 a side view of a vehicle in the form of an at least partly electric truck 100 is shown. The vehicle 100 comprises a control system 10 and an electric energy system 1 according to example embodiments of the present invention. Even though an at least partly electric truck 100 is shown, the present invention is not only limited to this type of vehicle, but may also be used in other vehicles, such as buses, construction equipment, passenger cars and also in marine vessels.

Figure 2:
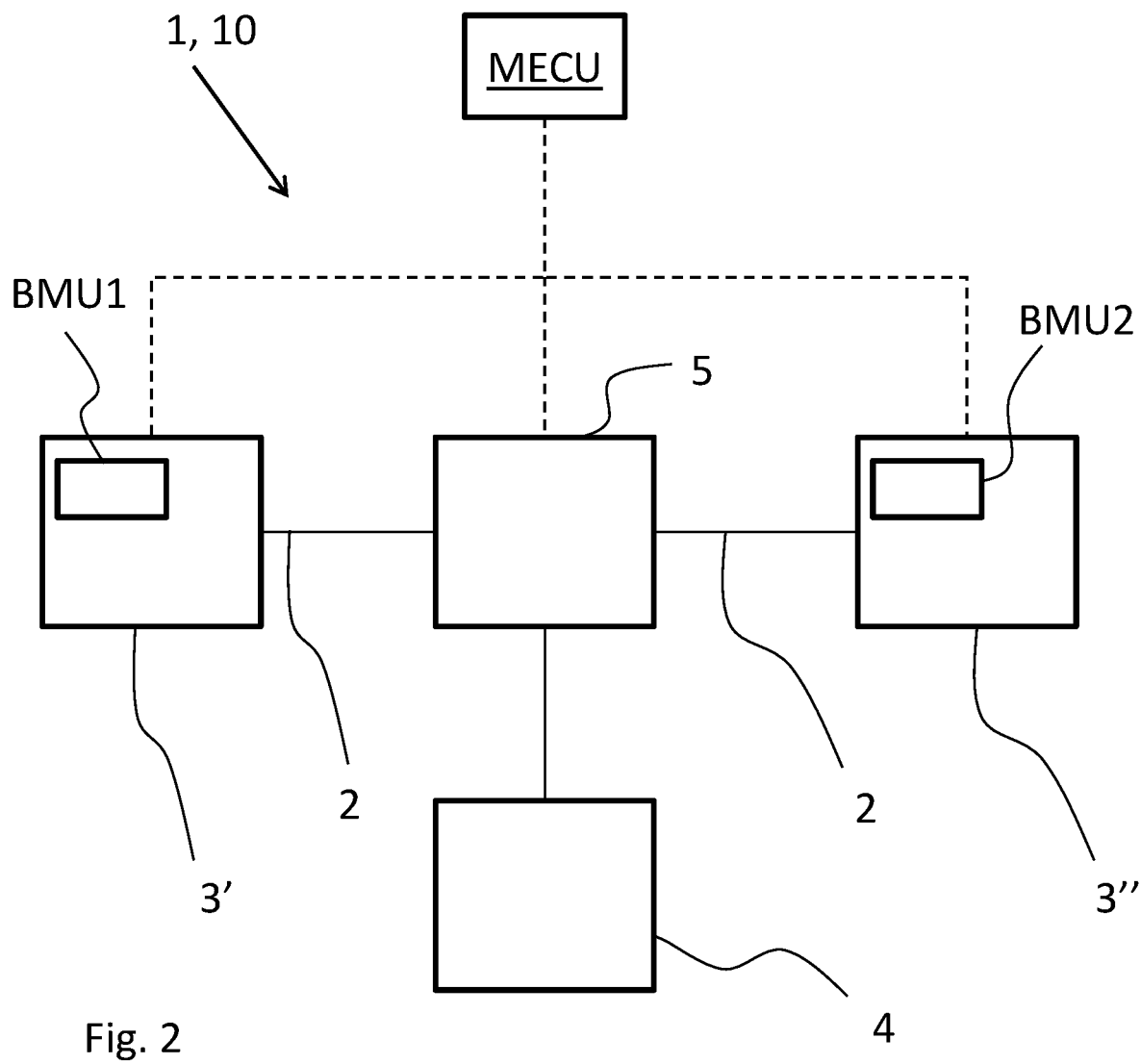
FIG. 2 is a schematic view of a control system and an electric energy system according to example embodiments of the present invention.
Figure 3:
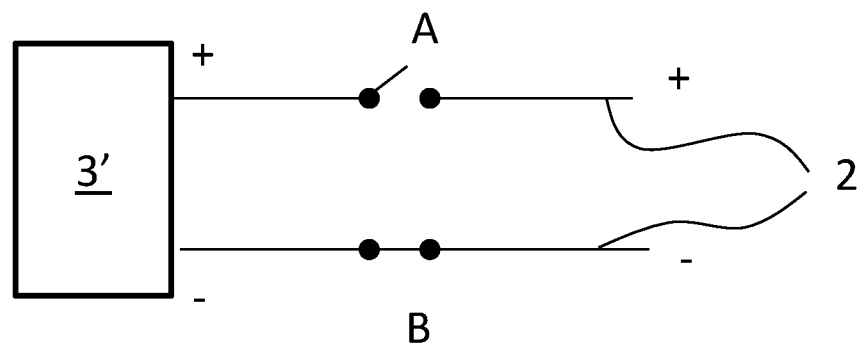
FIG. 3 is a schematic view of a battery and two contactors according to an example embodiment of the present invention.

With respect to especially FIGS. 2 and 3, a control system 10 and an electric energy system 1 according to example embodiments of the present invention will be described. The electric energy system 1 which is intended for propulsion of e.g. the vehicle 100 as shown in FIG. 1 comprises a traction voltage bus 2, a plurality of batteries 3', 3" which are electrically connectable to each other via the traction voltage bus 2. Each battery 3', 3" is electrically connectable to the traction voltage bus 2 by at least one contactor A, B, see e.g. FIG. 3. In the shown embodiment the battery 3' is electrically connectable by two respective contactors A, B; one contactor A for a positive terminal + of the battery 3' and another contactor B for a negative terminal − of the battery 3'. In the shown example the contactor A is open and the contactor B is closed, i.e. it may be welded. The same or similar configuration may also be present for the other battery 3". Accordingly, FIG. 2 shows an embodiment comprising two batteries 3', 3". It shall however be noted that the electric energy system 1 may comprise more than two batteries. The electric energy system 1 is here a high voltage system, wherein each battery 3', 3" is connectable to each other via a so called junction box 5. The junction box 5 may be defined as a connecting central or the like which electrically and/or communicatively connects different electric components of the electric energy system 1. Furthermore, in the embodiment shown in FIG. 2, each battery 3', 3" is electrically connectable to an electric traction motor 4 for propulsion of e.g. the vehicle 100. Accordingly, the batteries 3', 3" can be used for providing power to the electric traction motor 4 and/or the electric traction motor may be used as a generator for charging the batteries 3, 3". It shall be noted that the electric energy system 1 may comprise more than one electric traction motor, such as two electric traction motors or one electric traction motor for each driven wheel of e.g. the vehicle 100.

FIG. 2 further shows a control system 10 for controlling the electric energy system 1. The control system 10 comprises a respective battery control unit BMU1, BMU2 for each one of the plurality of batteries 3', 3". The control system 10 further comprises a master electronic control unit MECU for controlling the plurality of batteries 3', 3". The master electronic control unit MECU is communicatively connected to each one of the battery control units BMU1, BMU2, indicated by dashed lines in FIG. 2. As shown, the master electronic control unit MECU may preferably be a separate unit with respect to the batteries 3', 3". Further, as shown, each battery control unit BMU1, BMU2 may be integrated with each respective battery 3', 3".

The master electronic control unit MECU is configured to provide a predefined electric interference to the traction voltage bus 2 after a signal to open the at least one contactor A, B of each battery 3', 3" has been provided. The predefined electric interference may be any type of predefined electric interference as defined herein, such as a predefined voltage level. Furthermore, the signal to open the at least one contactor A, B of each battery 3', 3" is preferably a signal issued by the master electronic control unit MECU which is provided to each battery control unit BMU1, BMU2.

Each battery control unit BMU1, BMU2 is configured to detect the predefined electric interference, and when the predefined electric interference is detected by at least one of the battery control units, BMU1 and/or BMU2, the at least one battery control unit BMU1, BMU2 is further configured to issue a signal indicative of that the predefined electric interference was detected. The signal indicative of that the predefined electric interference was detected is preferably issued to the master electronic control unit MECU.

The signal indicative of that the predefined electric interference was detected is an indication of that at least one contactor A, B is still connected to the traction voltage bus 2, i.e. it has likely been welded. As such, a high voltage may still be present, implying a dangerous situation for a user. By the provision of the control system as disclosed herein, it can be identified which battery or which batteries which have at least one welded contactor.

Additionally, or alternatively, each battery control unit BMU1, BMU2 may be configured to detect if the battery 3', 3" experiences a voltage drift during a relaxation period after the signal to open the at least one contactor A, B of each battery 3', 3" has been provided. When at least one battery 3', 3" does not experience the voltage drift, the battery control unit BMU1, BMU2 of the at least one battery 3', 3" is further configured to issue a signal indicative of that no voltage drift was detected. As such, this configuration can be used as a second indication that at least one contactor has been welded. Using this approach in addition to the aforementioned approach implies a redundant control system providing a more robust and reliable identification of at least one welded contactor.

Preferably, the battery control unit BMU1, BMU2 for the at least one battery 3', 3" is further configured to issue the signal indicative of that no voltage drift was detected to the master electronic control unit MECU.

The master electronic control unit MECU may further be configured to identify if at least one contactor A, B of at least one of the batteries 3', 3" is welded before providing the predefined electric interference to the traction voltage bus 2. This may be done by e.g. detecting the presence of a voltage level in the traction voltage bus 2.

Furthermore, the battery control unit BMU1, BMU2 for the at least one battery 3', 3" may further be configured to issue the signal indicative of that the predefined electric interference was detected to the master electronic control unit MECU. Thereby the master electronic control unit MECU can determine which one or which ones of the batteries 3', 3" that has/have at least one welded contactor A, B.

The master electronic control unit MECU may further be configured to issue a signal to each one of the battery control units BMU1, BMU2 indicative of that the predefined electric interference will be provided. As such, each battery control unit BMU1, BMU2 may be prepared for when the predefined electric interference will be provided, implying further improved and more reliable identification of at least one welded contactor A, B.

The predefined electric interference may be at least one of a predefined voltage level, a predefined load, a load with a predefined current level, and a predefined frequency level.

Each one of the control units MECU, BMU1, BMU2 as disclosed herein may comprise a computer program and/or a computer readable medium configured to perform certain steps of the method as disclosed herein. The control units MECU, BMU1, BMU2 may include a microprocessor, microcontroller, programmable digital signal processor or another programmable device. The control units MECU, BMU1, BMU2 may also, or instead, include an application specific integrated circuit, a programmable gate array or programmable array logic, a programmable logic device, or a digital signal processor. Where the control units MECU, BMU1, BMU2 include a programmable device such as the microprocessor, microcontroller or programmable digital signal processor mentioned above, the processor may further include computer executable code that controls operation of the programmable device. The control units MECU, BMU1, BMU2 may comprise embedded hardware, sometimes with integrated software. Examples of physical relationships are: shared casing and components mounted on one or several circuit boards. The control units MECU, BMU1, BMU2 may also comprise one or more sub-control units, i.e. the respective control units MECU, BMU1, BMU2 may be more than one single control unit.

Figure 4:
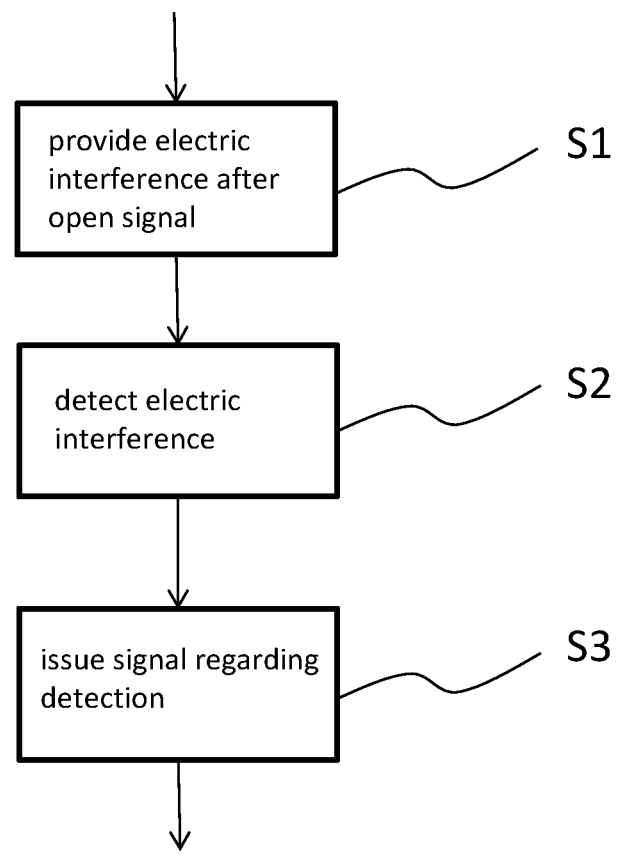
FIG. 4 is a flowchart of a method according to an example embodiment of the present invention.

FIG. 4 shows a flowchart of a method for identifying at least one welded contactor A, B of an electric energy system 1 for propulsion of a vehicle 100 according to an example embodiment of the present invention.

The method comprises:
S1) providing a predefined electric interference to the traction voltage bus 2 by use of the master electronic control unit MECU after a signal to open the at least one contactor of each battery has been provided;
for each battery 3', 3",
S2) determining if the predefined electric interference is detected, and when the predefined electric interference is detected by at least one battery control unit BMU1, BMU2,
S3) issuing a signal from the at least one battery control unit BMU1, BMU2 indicative of that the predefined electric interference was detected.

Additionally, or alternatively, the method may comprise:
for each battery 3', 3", determining if it experiences a voltage drift during a relaxation period after the signal to open at least one contactor A, B of each battery 3', 3" has been provided, and when at least one battery 3', 3" does not experience the voltage drift, issuing a signal from the battery control unit BMU1, BMU2 of the at least one battery 3', 3" indicative of that no voltage drift was experienced.

The method may further comprise identifying when at least one contactor A, B of at least one of the batteries 3', 3" is welded before providing the predefined electric interference to the traction voltage bus 2.

The signal from the at least one battery control unit BMU1, BMU2 indicative of that the predefined electric interference was detected may be issued to the master electronic control unit MECU.

The method may further comprise issuing a signal to each one of the battery control units BMU1, BMU2 indicative of that the predefined electric interference will be provided.

It is to be understood that the present invention is not limited to the embodiments described above and illustrated in the drawings; rather, the skilled person will recognize that many changes and modifications may be made within the scope of the appended claims.

The invention claimed is:

1. A control system for controlling an electric energy system for propulsion of a vehicle, wherein the electric energy system comprises:
a traction voltage bus;
a plurality of batteries electrically connectable to each other via the traction voltage bus, and wherein each battery is electrically connectable to the traction voltage bus by at least one contactor; wherein the control system comprises a respective battery control unit for each one of the plurality of batteries, wherein the control system further comprises:
a master electronic control unit for controlling the plurality of batteries, wherein the master electronic control unit is communicatively connected to each one of the battery control units, and wherein the master electronic control unit is configured to provide a predefined electric interference to the traction voltage bus after a signal to open the at least one contactor of each battery has been provided by the master electronic control unit, and wherein each battery control unit is configured to detect the predefined electric interference, and when the predefined electric interference is detected by at least one of the battery control units, the at least one battery control unit is further configured to issue a signal indicative of that the predefined electric interference was detected, wherein the issued signal indicative of that the predefined electric interference was detected is used for identifying that the at least one contactor is welded.

2. The control system according to claim 1, wherein each battery control unit is configured to detect if the battery experiences a voltage drift during a relaxation period after the signal to open the at least one contactor of each battery has been provided, and when at least one battery does not experience the voltage drift, the battery control unit of the at least one battery is further configured to issue a signal indicative of that no voltage drift was detected.

3. The control system according to claim 2, wherein the battery control unit for the at least one battery is further configured to issue the signal indicative of that no voltage drift was detected to the master electronic control unit.

4. The control system according to claim 1, wherein the master electronic control unit is further configured to identify if at least one contactor of at least one of the batteries is welded before providing the predefined electric interference to the traction voltage bus.

5. The control system according to claim 1, wherein the battery control unit for the at least one battery is further configured to issue the signal indicative of that the predefined electric interference was detected to the master electronic control unit.

6. The control system according to claim 1, wherein the master electronic control unit is further configured to issue a signal to each one of the battery control units indicative of that the predefined electric interference will be provided.

7. The control system according to claim 1, wherein the predefined electric interference is at least one of a predefined voltage level, a predefined load, a load with a predefined current level, and a predefined frequency level.

8. An electric energy system for propulsion of a vehicle, wherein the electric energy system comprises:
a traction voltage bus;
a plurality of batteries electrically connectable to each other via the traction voltage bus, wherein each battery is electrically connectable to the traction voltage bus by at least one contactor; and
the control system according to claim 1.

9. A method for identifying at least one welded contactor of an electric energy system for propulsion of a vehicle, wherein the electric energy system comprises a traction voltage bus, a plurality of batteries electrically connectable to each other via the traction voltage bus, wherein each battery is electrically connectable to the traction voltage bus by at least one contactor, and a master electronic control unit for controlling the plurality of batteries, wherein the master electronic control unit is communicatively connected to a respective battery control unit for each one of the batteries, wherein the method comprises:
providing a predefined electric interference to the traction voltage bus by use of the master electronic control unit after a signal to open the at least one contactor of each battery has been provided by the master electronic control unit;
for each battery, determining if the predefined electric interference is detected, and when the predefined electric interference is detected by at least one battery control unit, issuing a signal from the at least one battery control unit indicative of that the predefined electric interference was detected wherein the issued signal indicative of that the predefined electric interference was detected is used for identifying that the at least one contactor is welded.

10. The method according to claim 9, wherein the method further comprises:
for each battery, determining if it experiences a voltage drift during a relaxation period after the signal to open at least one contactor of each battery has been provided, and when at least one battery does not experience the voltage drift, issuing a signal from the battery control unit of the at least one battery indicative of that no voltage drift was experienced.

11. The method according to claim 9, further comprising identifying when at least one contactor of at least one of the batteries is welded before providing the predefined electric interference to the traction voltage bus.

12. The method according to claim 9, wherein the signal from the at least one battery control unit indicative of that the predefined electric interference was detected is issued to the master electronic control unit.

13. The method according to claim 9, further comprising issuing a signal to each one of the battery control units indicative of that the predefined electric interference will be provided.

14. The method according to claim 9, wherein the predefined electric interference is at least one of a predefined voltage level, a predefined load, a load with a predefined current level, and a predefined frequency level.

15. A vehicle comprising the control system according to claim 1.

* * * * *